H. E. PETERSON.
MACHINE FOR GRADING FRUIT.
APPLICATION FILED JAN. 28, 1916.
1,214,821.
Patented Feb. 6, 1917.
2 SHEETS—SHEET 1.
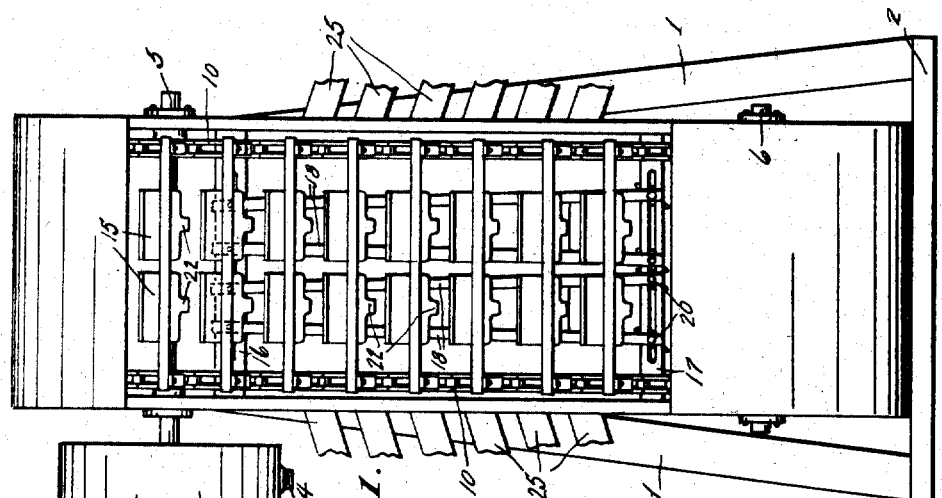
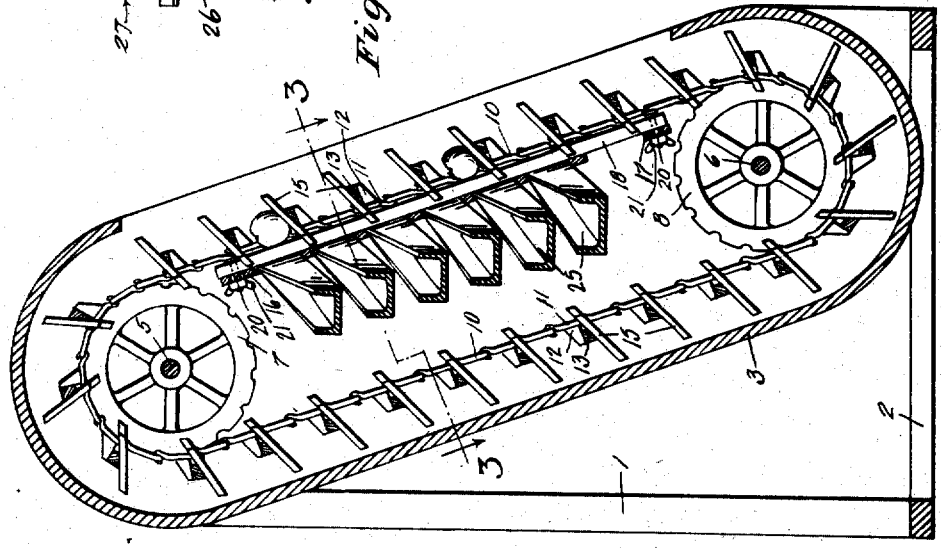
WITNESSES:
A. B. Cornelius
Horace Barnes
INVENTOR
Henry E. Peterson
BY
Pierre Barnes
ATTORNEY

H. E. PETERSON.
MACHINE FOR GRADING FRUIT.
APPLICATION FILED JAN. 28, 1916.

1,214,821.

Patented Feb. 6, 1917.
2 SHEETS—SHEET 2.

WITNESSES:
A. B. Cornelius
Horace Barnes

INVENTOR
Henry E. Peterson
BY
Pierre Barnes
ATTORNEY

UNITED STATES PATENT OFFICE.

HENRY E. PETERSON, OF SEATTLE, WASHINGTON.

MACHINE FOR GRADING FRUIT.

1,214,821.  Specification of Letters Patent.  Patented Feb. 6, 1917.

Application filed January 28, 1916. Serial No. 74,743.

*To all whom it may concern:*

Be it known that I, HENRY E. PETERSON, a citizen of the United States, residing at Seattle, in the county of King and State of Washington, have invented certain new and useful Improvements in Machines for Grading Fruit, of which the following is a specification.

My invention relates to improvements in machines for grading fruit according to size.

Among the objects of my invention is the provision of an improved device for the purpose described, that will be simple in its plan of construction, efficient in its grading operations, and which may be operated without other power than the gravity of the fruit which is introduced in the machine for grading, and automatically actuates the relatively few moving parts required in the performance of the function of the machine.

Another object of the invention is the provision of a governing device to control the speed of the mobile elements of the machine whereby the progress of the fruit through the machine will be maintained automatically at a rate of suitable speed to produce the best results in the selective grading of the fruit.

The invention consists in the novel construction of a fruit-grading machine, the combination and arrangement of its several elements to produce an automatically operated device, and the adaptation therewith of a governor of novel construction, as will be fully described in the following specification, illustrated in the accompanying drawings and finally set forth in the appended claims.

Figure 5:
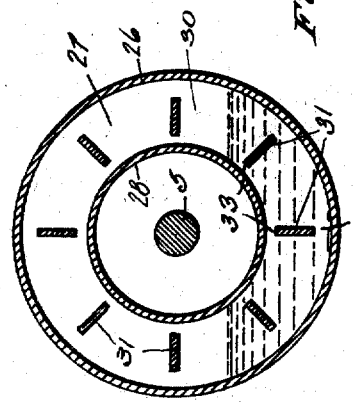
Figure 4:
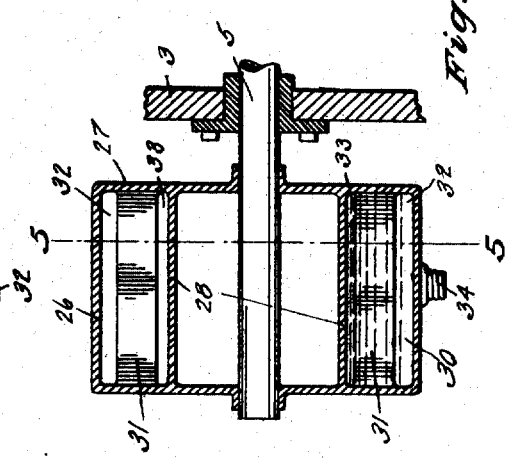
Figure 3:
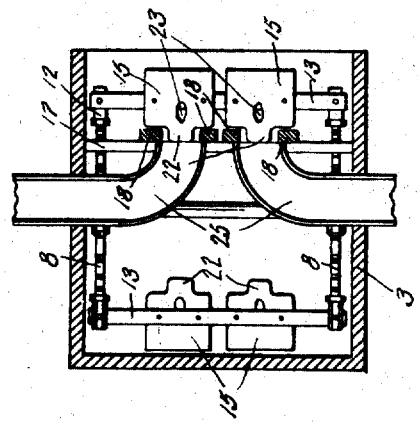

In said drawings, Figure 1 is a front elevational view of a fruit-grading machine constructed in accordance with my invention. Fig. 2 is a view in medial vertical section through the casing of the machine, as shown in Fig. 1. Fig. 3 is a cross-sectional view on line 3—3 of Fig. 2. Fig. 4 is a vertical longitudinal sectional view of the governor utilized included in my invention. Fig. 5 is a cross-sectional view of said governor taken on lines 5—5 of Fig. 4.

Referring to said views, the reference numeral 1 indicates the upright posts and 2 the sills of a supporting framework for the machine proper, it being understood that such framework may take any suitable form.

3 indicates a casing for the chief operative parts of the machine, said casing being desirably open upon its front side to permit of the introduction of the fruit to be graded and observation of the work being performed. Said casing may desirably be slightly inclined from the perpendicular, as shown.

Transverse shafts 5 and 6 are suitably mounted for rotation in proximity of the upper and lower ends of the casing, respectively. Sprocket wheels 7 are keyed in spaced relation upon each end of said shaft 5 and similar sprocket wheels 8 are respectively mounted in alinement therewith and in the same manner upon the lower shaft 6.

A link-belt or other suitable equivalent 10 is operatively mounted upon each pair of sprocket wheels 7—8 upon each side, whereby the shafts 5 and 6 may be rotated simultaneously and in unison upon the application of power thereto. Certain of the links 11 of said link-belts are formed with an attachment lug 12 to which are rigidly connected the ends of slats 13 disposed to lie and travel horizontally and in parallel with said belts. Fixedly mounted upon said slats are inclined shelves 15 upon each of which the fruit is positioned singly. Said shelves are arranged in vertically alined series and any number of series may be employed. In my illustrated embodiment I show two such series and the express manner of utilizing the same for the grading of apples will be explained hereinafter.

Slotted bars 16 and 17 are rigidly secured transversely of the casing in proximity of the upper and lower extremities of the front opening therein, to which bars pairs of upright diverging strips 18 are adjustably secured in relation to said shelves 15 to afford guide-ways for the fruit, as will be presently explained.

The adjustable connections shown comprise threaded bolts 20 passing through the ends of said strips 18 and through the slots of said bars 16 and 17, respectively, whereat winged nuts 21 may be provided to secure said strips in desired separated condition to make the spaces between said pairs of strips or their angle of divergence predeterminately more or less. Said shelves are desirably provided with an inwardly protruding lip 22 extending between the respective said pairs of strips and also with a depression or aperture 23, as shown, to assist the operator in the proper location of the fruit upon the shelves and also to accommodate the stem of the fruit, if any, as in the case of some varieties of apples.

Inclined chutes 25 are provided at spaced intervals in association with said strips 18 to receive the fruit passing therebetween and are arranged to convey the graded fruit away to prepared boxes or bins.

The weight of the fruit resting upon the shelves 15 actuates the endless belts to travel downwardly upon the front side of the machine upon the sprocket wheels 7 and 8.

A speed-equalizing device is provided to maintain the rate of travel of said belts as nearly uniform as practicable, regardless of the weight of fruit carried thereby. Several forms of governor may be employed, but that illustrated herewith has been found to be very satisfactory. It consists in a cylindrical shell 26 having side walls 27, axially mounted upon the projecting end of the shaft 5 to turn therewith. An inner cylindrical partition 28 concentric with the outer shell 26 provides an annular water-holding compartment 30 in which are positioned a plurality of fixed plates 31 having their flat sides directed radially of the shell and having their inner and outer edges spaced from the inner partition 28 and outer shell 26, respectively, the space 32 between the outer shell and the plates being somewhat larger than the space 33 upon the opposite side.

Water is introduced within the compartment 30 through a closure 34 to any height desired below the axis of rotation. As the shaft 5 revolves, carrying the governor with it, the water seeks its level and offers resistance to the movement of the plates 31 which resistance is increased as the speed increases and tends to maintain the rotative speed at a relatively uniform rate. More or less water introduced within the compartment 30 will serve to regulate the action of the governor.

In describing the manner of operation of my invention, I will illustrate its employment in grading apples according to size and it will be understood that it may be employed in an advantageous manner with other fruit or articles. The operator places the fruit upon the shelves by preferably employing both hands and selecting the fruit according to color by taking with his right hand, for example, the highly colored fruit and depositing it upon the uppermost shelf upon the right-hand series, while with his left hand he selects a less highly colored apple and deposits it upon the adjoining shelf of the left-hand series; thus the operator grades the apples according to fineness of color as he places them within the machine.

The operator will push downwardly upon the belt exposed by the open front of the casing to bring another pair or plurality of shelves into position and similarly places an apple upon each shelf until the accumulated weight of apples upon the shelves will be sufficient to set the belts in motion, whereupon all the operator does is to place the apples upon the uppermost shelves as they are presented. The operator places the apple upon its end on one of said shelves, whereby, owing to the inclination of the casing and the shelves, it tends to roll inwardly of the machine and presses against the strips 18.

The strips 18 are assumed to have been positioned in downwardly diverging relation, as previously described, to afford a diverging space therebetween. As the apples gravitate downwardly upon said shelves, their rotundity causes them to work more and more within the space between said strips until said space becomes sufficiently wide to allow them to pass through, whereupon they slide over the lip 22 upon the respective chute 25 which conveys them to separate bins for packing or otherwise.

The invention is extremely simple in construction, and has demonstrated in practice to be a most efficient and practical machine for the purpose described.

What I claim is—

1. A machine for grading fruit having substantially vertical grading strips extending in downwardly diverging relation, means to adjust said strips to vary the space therebetween, a conveyer belt, inclined shelves mounted upon said belt adapted to support specimens of fruit thereon and associated with said strips whereby the fruit is disposed to engage said strips during the downward travel of the shelves.

2. A machine for grading fruit having substantially vertical grading strips extending in downwardly diverging relation, means to vary the space between said strips, sprocket wheels mounted for rotation in substantially superposed relation, a conveyer belt operatively connected with said wheels, inclined shelves associated with said belt adapted to support specimens of fruit thereon and formed with a lip extending between said strips whereby the fruit may pass between said strips.

3. A machine for grading fruit, having substantially vertical grading strips extending in downwardly diverging relation, means to vary the space between said strips, sprocket wheels mounted for rotation in substantially superposed relation, a conveyer belt operatively connected with said wheels, inclined shelves associated with said belt adapted to support specimens of fruit thereon and formed with a lip extending between said strips whereby the fruit may pass between said strips, and a speed-governing device to control the movement of said belt.

4. In a machine for grading fruit, the combination of a pair of conveyer belts arranged to travel in side by side parallel relation, said belts having a plurality of connecting transverse slats, an inclined shelf upon each said slat, each shelf adapted to support a single specimen of fruit, and a pair of adjustable downwardly diverging spaced strips against which the fruit is disposed to lean in the downward travel of said belts, said belts being actuated by the gravity of the fruit supported upon said shelves.

Signed at Seattle, Washington, this 29th day of December, 1915.

HENRY E. PETERSON.

Witnesses:
HORACE BARNES,
E. PETERSON.

Copies of this patent may be obtained for five cents each, by addressing the "Commissioner of Patents, Washington, D. C."